(12) United States Patent
Carcaterra et al.

(10) Patent No.: US 9,370,973 B2
(45) Date of Patent: Jun. 21, 2016

(54) SYSTEM AND METHOD FOR OPTICAL MEASURING OF TIRE ADHESION AND TIRE SUITABLE FOR SUCH MEASUREMENT

(75) Inventors: Antonio Carcaterra, Rome (IT); Massimo Platini, Rome (IT); Nicola Roveri, Viterbo (IT)

(73) Assignees: UNIVERSITA' DEGLI STUDI ROMA "LA SAPIENZA", Rome (IT); ACE S.R.L., Rome (IT)

( * ) Notice: Subject to any disclaimer, the term of this patent is extended or adjusted under 35 U.S.C. 154(b) by 0 days.

(21) Appl. No.: 14/235,137

(22) PCT Filed: Jul. 26, 2012

(86) PCT No.: PCT/IB2012/053818
§ 371 (c)(1),
(2), (4) Date: Jan. 27, 2014

(87) PCT Pub. No.: WO2013/014637
PCT Pub. Date: Jan. 31, 2013

(65) Prior Publication Data
US 2014/0172191 A1    Jun. 19, 2014

(30) Foreign Application Priority Data

Jul. 27, 2011 (IT) .............. RM2011A0401

(51) Int. Cl.
*B60C 19/00* (2006.01)
*B60T 8/172* (2006.01)

(52) U.S. Cl.
CPC ............. *B60C 19/00* (2013.01); *B60T 8/1725* (2013.01); *B60T 2210/12* (2013.01); *B60T 2240/04* (2013.01); *Y10T 152/10495* (2015.01)

(58) Field of Classification Search
CPC .... B60C 19/00; B60T 8/1725; B60T 2210/12
USPC .............................................. 701/1; 152/450
See application file for complete search history.

(56) References Cited

U.S. PATENT DOCUMENTS

| 6,674,928 B2 * | 1/2004 | Johnson et al. .................. 385/12 |
| 7,418,171 B2 * | 8/2008 | Grattan et al. .................. 385/37 |
| 8,022,835 B2 * | 9/2011 | Coleman ..................... 340/686.6 |
| 2007/0090281 A1 * | 4/2007 | Coleman ..................... 250/227.14 |
| 2007/0256487 A1 * | 11/2007 | Bickel .......................... 73/146.2 |

* cited by examiner

*Primary Examiner* — Mussa A Shaawat
*Assistant Examiner* — Michael Berns
(74) *Attorney, Agent, or Firm* — Abelman, Frayne & Schwab

(57) ABSTRACT

A system for measuring the grip between a vehicle wheel tire and a road surface comprising a fiber optic (19) provided with FBG sensors (21) affixed to the internal surface of the tire, which record data regarding the state of state of residual grip Grs of the tire to the road. The fiber optic (19) has an end part (20) which, through an optical joint (5, 6) transmits the data to an instrumentation of the vehicle, making it pass through a spectrum analyzer (12), a data processing system (14), which implements the residual grip identification algorithm Grs. The residual grip information is sent to a display that is visible by the driver and/or to active control systems for driving the vehicle.

7 Claims, 3 Drawing Sheets

SYSTEM AND METHOD FOR OPTICAL MEASURING OF TIRE ADHESION AND TIRE SUITABLE FOR SUCH MEASUREMENT

CROSS-REFERENCE TO RELATED APPLICATIONS

This application is a National Phase of PCT/IB2012/053818, filed 26 Jul. 2012 which claims the priority of Italian Application No. RM2011A000401, filed 27 Jul. 2011, all of which are incorporated herein by reference.

FIELD OF THE INVENTION

The present invention relates to a device for measuring the grip of a tyre with applications in the transport sector in general, in the motor and motorcycle fields in particular. The invention also relates to a method for measuring the grip between a tyre and road surface and to a tyre suitable for said measuring.

BACKGROUND OF THE INVENTION

There are known integrated systems of sensors for the monitoring of key variables in the dynamics of the vehicle with use of complex technologies both in the sensor and data transmission field.

One of the greatest difficulties in equipping the tyre with sensors used in the prior art, lies in the data transmission and supply system. Conventional devices, such as frictional contacts and batteries, have a limited duration, low reliability, significant dimensions and introduce noise into the measuring system, and cannot thus be used in operating conditions. Many studies have therefore focused on transmitting the data by means of wireless systems, on the use of passive sensors and on on-site energy harvesting devices with significant devices for applications of an industrial nature. In addition, the installed sensors must be small and economical since the tyres are motor industry components having a relatively low cost. As regards indirect monitoring, the variable of interest is extrapolated from the magnitudes acquired by the sensors, generally the speed of the vehicle and the angular speed of the wheel. Yi et al [IEEE T. Contr. Sys. T. 2002, 10, 381-392] used wheel spin, the speed of the vehicle and the wheel load to determine the coefficient of friction. Since the phenomena that govern tyre dynamics are non-linear, it is difficult to establish general and reliable analytical reactions between measured magnitudes and magnitudes to be identified. In some cases, techniques based on fuzzy logic (Zhang, X. et al, In Proc. of IEEE Intelligent Vehicles Symposium, 2005; pp. 875-881) or on Kalman filters (Gustafsson, F. et al, SAE Tech. Papers 2001, 2001-01-0796) can be relied upon. Albeit indirect monitoring of the variables is easily achieved, since it takes advantage of existing sensors, this process has a modest precision and requires a new calibration each time the tyre is inflated or replaced.

The techniques based on the direct detection of the variables have better accuracy. Since sensitivity is linked to the size of the sensor, MEMS/NEMS devices lend themselves very well for producing accurate pressure measurements, even with a good spatial resolution (Nabipoor, M. et al, J. Phys.: Conf. Ser. 2006, 34, 770-775). Tjiu et al (Tjiu, W. et al, In Proc. of IEEE International Conference on semiconductor Electronics, 2004; pp. 350-353) used a MEMS device to monitor the operating conditions of the tyre. Yi (Yi, J., IEEE-ASME T. Mech. 2008, 13, 95-103) used a polyvinylidene fluoride-based to measure tread deformation. Devices that use surface acoustic waves (SAW) have also been used to monitor tyre deformation (Pohl, A. et al, IEEE T. Instrum. Meas. 1999, 48, 1041-1046), Since all these sensors primarily comprise of highly rigid materials, an increase in sensitivity is only possibly by inducing flexional states of deformation and achieving very thin thicknesses (Shin, K. et al, Sens. Actuat. A 2005, 123-124, 30-35). This causes in general a high wear of the devices and limits the use thereof.

Accelerometer sensors are the instrument mainly adopted to monitor instantaneous grip in tyre-road contact.

Processing of the acceleration signals detected on the internal surface of the tread allows certain information on the speed range in the contact zone between tyre and road surface to be obtained and allows, by means of suitable algorithms, identification of the tyre grip. Certain drawbacks characterise this technical solution. Firstly, current technologies provide, for the same sensor dimensions, the installation of few accelerometers, which scan a single segment of the contact area during rotation of the tyre. There are also demanding technical problems linked to the electrical supply difficulty of the sensor and to the radio transmission of the information outside the tyre. The power required for such supply can be produced inside the tyre itself by means of electromechanical systems that take advantage of the relative motion of small floating masses and inductive effects, or by means of other systems that anyhow require installation within the tyre carcass of an electrical power generator device. In addition, the information associated with the electric signal generated by said sensors needs to be sent outside the tyre, thus requiring a radio transmission system for the information, which must also be necessarily housed inside the tyre.

Disadvantageously, both the direct or indirect measurement methods permit the acquisition, with low spatial-temporal resolution, of the variables, and are not therefore capable of monitoring and transmitting the dynamic variables following an increase in speed. Further studies and technological developments are therefore necessary in order to increase said resolution.

With regard to wireless transmission systems, data can be transferred from the tyre to the receiver through active or passive devices. Some simple systems use the resonance of a capacitive-inductive unit and require to be powered in order to send the radio signal (Yi, J., IEEE-ASME T. Mech. 2008, 13, 95-103). The main limitations are the limited duration and the dependence on the temperature of the power supply batteries. This restricts their use to laboratory tests. For use in operating conditions, it is therefore necessary to adopt passive or onsite power supply devices through energy harvesting techniques.

Energy harvesting consists of converting mechanical energy into electrical energy through capacitor generators (Meninger, S. et al, IEEE T. Vlsi. Syst. 2001, 9, 64-76), electromagnetic or piezoelectric generators (Jeong, S. et al, Sens. Actuat. A 2008, 148, 158-167). However, to date, the electrical energy provided is low, less than 1 mW/cm$^2$, and is insufficient to adequately acquire and transmit the signal.

A typical passive device is based on the electromagnetic coupling of two inductors (Jachowicz, R. et al, Sens. Actuat. A 2000, 85, 402-408). Matsuzaki et al (Matsuzaki, R. et al, Adv. Compos. Mater. 2005, 14, 147-164) produced such a device through a resonant circuit formed by an inductor and a capacitor. By renouncing the magnetic coupling, Schimetta et al (Schimetta, G. et al, IEEE T. Microw. Theory 2000, 48, 2730-2735) produced a SAW transponder to supply a capacitive pressure sensor. However, for applications in operating conditions it is still necessary to improve the compatibility between the passive sensor and the tyre.

Disadvantageously, all the sensor productions of the prior art, applied for measuring the grip between tyre and road surface, present considerable wear phenomena and low reliability against the high cost and complexity of the entire system comprising the sensor, the respective supply and data transmission system.

There is therefore a need to produce a system for measuring the grip between tyre and road surface, which allows the aforementioned drawbacks to be overcome.

SUMMARY OF THE INVENTION

The main aim of the present invention is that of producing a system for measuring the grip between tyre and road surface, for applications in the transport sector, which permits the instantaneous detection of the degree of grip of the tyre to the road surface, and precisely of the degree of residual grip, by means of optical sensor measurements of the deformations of the tyre from the internal part of the carcass, in contact with the pressurised air and not in direct contact with the road surface.

The device object of the present patent has the aim of measuring the ratio of the surface area of the tyre where there is friction to the total area of the tyre surface in contact with the ground. This ratio varies between the extreme values 0 and 1: the value 1 corresponds to the global friction status of the wheel, i.e. to the complete loss of grip thereof. The instantaneous monitoring of this magnitude, which we shall define residual grip $G_{res}$, is the main object of the device of the present invention.

Another aim of the invention is that of envisaging a relative method for measuring the grip between tyre and road surface that permits the state of grip to be obtained starting from the measurement of the deformations of the tyre.

A further aim of the invention is that of producing a suitable tyre for the aforementioned measurement.

The present invention therefore proposes to achieve the above-discussed aims by producing a system for measuring the grip between a vehicle wheel tyre and the road surface, which, according to claim 1, comprises one or more fibre optics provided with FBG sensors fixed to the internal surface of the tyre, and adapted to record data regarding the state of the tyre, and associated to a difference wave length λ reflected by said FBG sensors integrated in one or more fibre optics having a terminal which emerges from the tyre, an optical joint to transmit the data to an instrumentation arranged inside the vehicle, a spectrum analyser to receive the data, which are sent to a data processing system, adapted to implement a residual grip identification algorithm and to send information regarding the residual grip to a device indicating the state of the tyre available for a user of the vehicle and/or to active control systems for driving the vehicle itself, A second aspect of the present invention provides a method for measuring the grip between tyre and road surface by means of the above system which, according to claim 5, comprises the following steps:

a—definition of three characteristic times $t_{in}$, $t_{peak}$, $t_{out}$ in the course of the rolling of the tyre on the part of the data processing system, b—sending of an interrogation signal from the data processing system to every FBG sensor, c—generating response signals λ(t) from the FBG sensors which are correlated to a deformation of the FBG sensor, d—digitalisation of these response signals λ(t) by means of a spectrum analyser, e—sending of the response signals λ(t) to the data processing system, f—decoding of said response signals λ(t) with spectroscopic techniques, g—converting said response signals λ(t) into strain signals ε(t) for every FBG sensor which is interrogated, h—calculating the characteristic times
$t_{in}$ by means of the formulae $$\begin{cases} \dfrac{D\varepsilon_{FBG}(t)}{Dt} = 0 \text{ per } t < t_{in} \\ \dfrac{D\varepsilon_{FBG}(t)}{Dt} \neq 0 \text{ per } t > t_{in} \end{cases}$$

$t_{out}$ by means of the formulae $$\begin{cases} \dfrac{D\varepsilon_{FBG}(t)}{Dt} \neq 0 \text{ per } t < t_{out} \\ \dfrac{D\varepsilon_{FBG}(t)}{Dt} = 0 \text{ per } t > t_{out} \end{cases}$$

[per = for]

$t_{peak}$ by means of the formulae $$\max_{t}\left\{\dfrac{D\varepsilon_{FBG}(t)}{Dt}\right\} = \dfrac{D\varepsilon_{FBG}(t_{peak})}{Dt}.$$

i—calculating the residual grip $G_{res}$ by means of the formula:

$$G_{res} = \dfrac{t_{peak} - t_{in}}{t_{out} - t_{in}}$$

A third aspect of the present invention provides a tyre according to claim 7.

The system of the invention advantageously comprises a plurality of local deformation sensors of the optical tyre. In particular, the internal surface of the tyre is equipped with one or more FBG sensors mounted along one or more optical fibres gripping said internal surface. These FBG sensors, in themselves known, are utilised in the present invention to record the local internal deformation of the tyre carcass by means of measuring the frequency of the light reflected from the various sections of fibre where an FBG sensor is present. Deformation of the tyre carcass can be determined from the frequency of the reflected light signals detected.

Advantageously, in the present invention the power needed for system operation is only the power of the light or light interrogation signal sent along the fibre optic or backbone. The light interrogation signal extends along the backbone and when it interacts with an FBG sensor it generates a respective response signal which extends backwards along the backbone itself. The transmission of the response signals associated with said light interrogation signal therefore takes place through the fibre optic itself.

A further advantage is represented in that the broad band source that generates the interrogation signal is provided on the chassis of the vehicle, therefore outside the tyre. A first end of the fibre optic or dorsal, provided on the tyre and gripping to the carcass thereof, is connected to the rotating axle onto which the wheel rim is connected, while a second end is simply fixed onto the tyre carcass.

Advantageously, the connection between the fibre optic provided in the tyre and a corresponding fibre optic provided in the vehicle chassis takes place by means of a rotary optical coupler (ROC). This rotary optical coupler permits both the transmission of the light interrogation signal, by the part of the fibre optic associated to the broad band source to the part of the fibre optic associated with the rotating axle and with the tyre, which the transmission of the response signals, i.e. the acquired information transported by the reflected light from the FBG sensors, from the rotating parts to the non-rotating part integral to the vehicle chassis.

The present invention permits the main difficulties of the technologies of the prior art, both relating to the power supply system and to the data transmission system, to be overcome, because:

(i) the power generator supplying the FBG sensors is integral to the affixed parts of the vehicle and external to the tyre; this generator consists of one light source that transmits light to the fibre optic that is integral to the tyre carcass by means of the contactless rotary optical coupler;

(ii) the optical signal sent on-board the tyre is modulated passing through the FBG sensors and reflected outside the tyre by means of the rotary optical coupler itself;

(iii) the optical signal is sent from the tyre to the vehicle by means of the sole presence of the optical joint, which thus replaces each data transmission device.

The measuring method, which is the object of another aspect of the present invention, is based on an appropriate analysis algorithm, which permits the tyre's residual grip measurement to be obtained.

Advantageously, the system and the method of the invention permit the running safety of the vehicle to be increased, while providing information on the degree of grip to both the driver and to the vehicle's active control systems, and the more in-depth investigation of tyre rolling and contact phenomena by means of the suitable use of the present invention in laboratory devices.

Further advantages of the inventions are:
the use of sensors made of materials having low rigidity and capable of long-term operating under even adverse operating conditions encountered by the tyres;
an improved compatibility between the passive sensor and the rubber of the tyre.

The dependent claims describe preferred embodiments of the invention.

BRIEF DESCRIPTION OF THE DRAWINGS

Further characteristics and advantages of the invention will become clearer in the light of the detailed description of a preferred but non-exclusive embodiment of an system for the optical measuring of the grip of a tyre, illustrated by way of a non-limiting example, with the assistance of the accompanying drawings, wherein.

DETAILED DESCRIPTION OF A PREFERRED EMBODIMENT OF THE INVENTION

Figure 1:
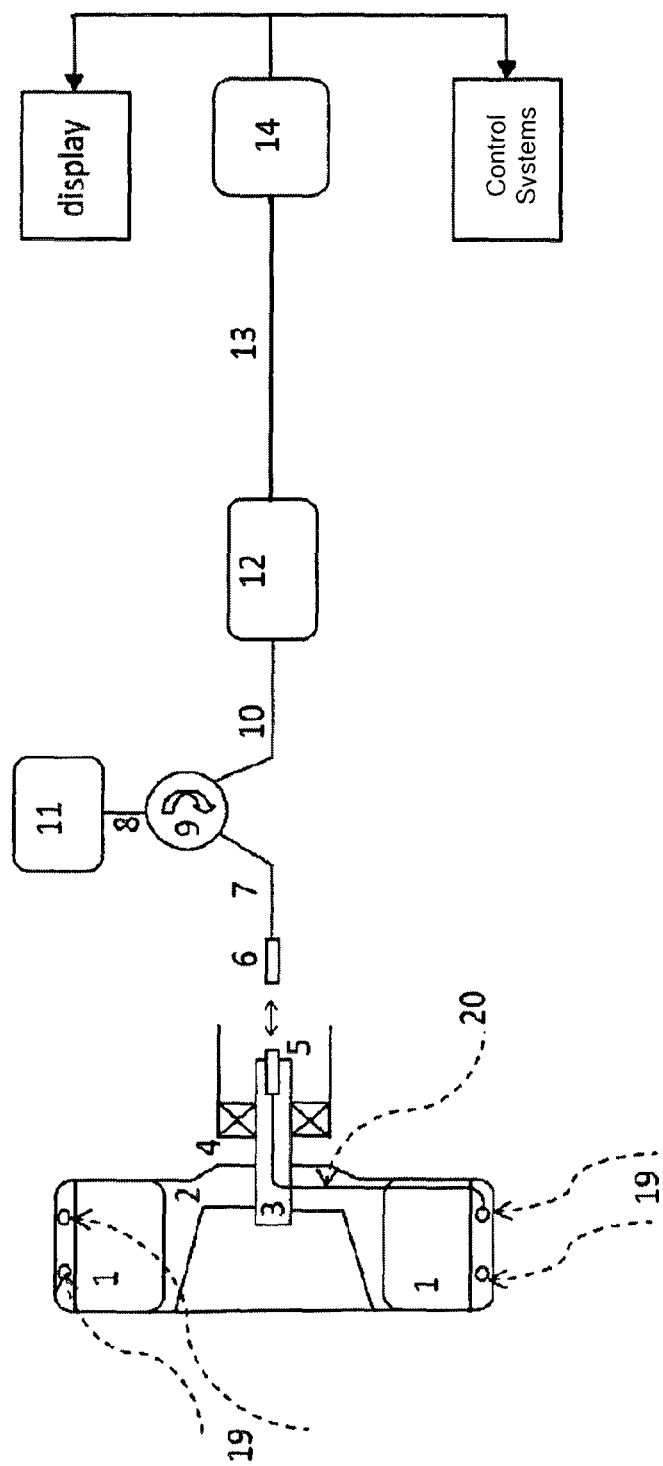
FIG. 1 represents a diagram of the system for the optical measuring of the grip of a tyre according to the invention.
Figure 2:
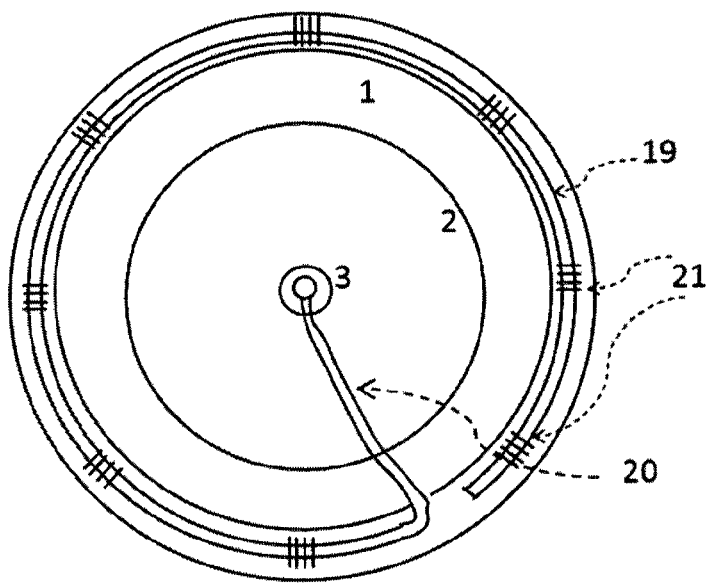
FIG. 2 represents a schematic side view of a tyre belonging to the system of the invention.

With reference to FIG. 1, there is represented a schematic view of a first embodiment of a measuring system S for the grip of a tyre, in a first, preferred embodiment thereof onto a car, of which only one wheel is shown. Clearly, the system is applied in the same way that is described hereunder, to all or to some of the car's wheels. It is also possible to apply the system of the invention onto any other type of vehicle where there should be a problem connected to the grip of one or more of the wheels. The system also applies to vehicles that have a different number of wheels from those of a common car, whether there are two, three or more than four wheels.

In this description, residual grip means the ratio of two areas. The area of contact between the tyre and the road surface can indeed, as is common knowledge, be subdivided into two parts: one part wherein the tyre is in contact with the road surface without friction; the other part wherein there is friction. When the entire area of contact is in a state of friction, the tyre is in a state of loss of global grip.

The measuring system comprises the wheel R of the vehicle consisting of at least the rim 2 and of the tyre 1, and is equipped by means of a fibre optic 19 with FBG sensors 21 housed in the tyre carcass. The fibre optic 19 has an end part 20 that emerges from the carcass, travels along the duly perforated axle 3, which is integral to the rim 2 and supported by the bearing 4, the external track of which is integral to the structure of the vehicle, and reaches the lens 5. This lens is part of an optical joint for the transmission of data, which comprises the lens 6 from the part of the structure of the vehicle, and is a known type of device that permits the transmission of optical signals between a first fixed element and a second rotary element of relative motion in respect of the first element. The transmission line of the light signals, with the assistance of this optical joint, is connected to a circuit further comprising an optical line 7, connected to the optical circulator 9. This in turn sends light signals, through the optical line 10, to the spectrum analyser 12 of the acquisition system.

The optical system sent to the fibre that is housed or incorporated in the body of tyre, is generated by the broad band light source 11, which sends it through the optical channel 8 to the circulator 9 and subsequently, by means of the line 7 and the optical joint. From the lens 6 of the optical joint it follows the optical line 20, which makes it circulate in the fibre 19 equipped with the FBG sensors 21.

The fibre optic 19 with its FBG sensors 21 can be incorporated in the rubber itself of the tyre at the time of the tyre's industrial production, and be affixed onto the internal surface of the tyre with adequate means, for example with special adhesives, in those cases in which the measuring system is produced as an accessory of a vehicle to be installed at a date subsequent to the manufacture of the tyre itself.

The spectrum analyser 12 determines the changes in wave length λ(t) of the light reflected by the various FBG sensors; these changes are proportional to the deformations of the FBG sensors themselves. These duly generated values are sent through the line 13 to the data processing system 14, for example a data processing control unit, which implements the residual grip identification algorithm and sends this information both to the dashboard display visible to the driver or to another user of vehicle and to the active control systems for driving the vehicle when these are provided in the vehicle.

The optical joint 5, 6 is a device that is commercially available as an axial coupler (fibre optic rotary joint), i.e. the beam that travels from the transmitter to the receiver is directed in parallel to the rotational axle of the wheel.

In one preferred embodiment for an application of the measuring system on-board a vehicle, there can be provided a radial optical joint, i.e. a device that performs the transmission of the light beam in a direction orthogonal to that of the wheel axle of the vehicle. This solution is constructively more convenient in the case of motor vehicles for which the suspension, steering control and brake system make the use of an axial coupler of little practical use.

The fibre optic sensors are particularly advantageous compared to traditional sensors. Indeed, being siliceous-based, they are electrically and chemically passive and are immune to electromagnetic interference, as well as being small in size. A further advantage is represented in that multiple FBG-type sensors can be inserted onto a single fibre in "multiplex" mode. This structure allows availability of a greater number of sensors, wired onto the same, single fibre, while having smaller overall dimensions and simple construction and utilising a single interrogation instrument.

It is thus possible to achieve an onsite, real-time monitoring of the state of deformation of a tyre.

The FBG sensor is practically an optical strain gauge obtained by photoengraving a material grid with a different refraction index into the optical fibre core. This photoengraving is achieved by illuminating the fibre optic transversely, through a suitable phase mask, with a coherent beam of UV light. The result of this process is that of obtaining a periodical change in the refraction index of the fire core in the longitudinal direction. The end consequence is that on the passage of a broad band light beam along the fibre, the grid thus photoengraved reflects a specific length wave. Every deformation of the fibre causes a displacement of said wave length λ that can be correlated to the deformation. Deformations measuring less than μstrain (1 μm per meter) can be accurately measured.

The principle exploited by the invention is now explained. When the structure in which the FBG sensor is immersed or glued onto, in this case the tyre, is subject to a deformation, the FBG sensor also deforms and changes its geometric characteristics. There is consequently a change in the length wave λ reflected by the sensor, which duly processed by the processing system by means of the below-described algorithm, provides the information on the residual grip of the tyre. The number of FBG sensors inserted along the fibre optic that is integral to the tyre, improves the resolution of the detection relating to the state of grip of the tyre surface in contact with the road surface. The more sensors there are along the fibre optic on the internal surface of the tyre, the more accurate the residual grip information will be.

The interrogation signal sent by the light source 11, through the optical circulator 9, extends along the fibre optic and when it meets an FBG sensor, one part of the signal is reflected and directed to the spectrum analyser 12, while the other part of the signal is transmitted to the next sensor. The spectrum analyser 12 receives an analogue input light signal and returns an digital output signal containing the information on the associated wave length. This signal is then subsequently processed by the control unit 14, which calculates the deformation associated with each interrogated FBG sensor, and which further processes this information to produce the residual grip measurement according to the below-described algorithm. This operation is iteratively repeated over time for each FBG sensor and the totality of the detection is processed by the control unit 14, which thus transforms it into an information on the state of grip of the tyre with the road surface, making it available in real time to the driver of the vehicle or to the control system of the vehicle itself. All the components of the described system, except for the data processing control unit 14, are commercially available and perfectly known in the prior art. The control unit 14, utilises micro-electronic production technologies that are totally known in the prior art, the algorithms implemented by it and described hereunder being on the other hand part of the present invention.

The system of the invention for identifying the state of grip again implements, in the processing control unit 14, an algorithm that is based on the indirect measurement of the ratio of the grip surface, i.e. the surface on which there are no contact slips between the tyre and the road, to the total contact surface between tyre and the road surface. This measurement provides an indication of how far the tyre is from the global spin condition; this condition, characterised by the spinning of the points of the tyre on all the contact area (it is the case of spinning under traction or of the blocking of wheel rotation when braking). The measurement analyses the tyre deformation data extracted from the optical sensors to arrive at the ratio of the aforementioned areas.

Let us consider the tyre when driving straight ahead, in the absence of transversal slips and with wheel camber angle and yaw rate of nil. From an elastic point of view, the tyre considered herein consists of a circumferential elastic band associated to the internal surface of the tyre in contact with the pressurised air, to which are connected radial elastic elements known in literature by the name of brushes.

The speed range in the contact zone is characterised by the expression:

$$V_x(\xi, t) = V_{Cx}(t) - \omega(t)R + \frac{Du_e(\xi, t)}{Dt}$$

$$V_x(\xi, t) = V_{Cx}(t) - \omega(t)R + \frac{\partial u_e(\xi, t)}{\partial t} + V_{Cx}\frac{\partial u_e(\xi, t)}{\partial \xi}$$

where $V_x(\xi,t)$ speed of the point of the wheel in contact with the road surface $V_{Cx}(t)$ speed of the centre of the wheel $\omega(t)$ angular speed of the wheel R rolling height of the tyre $u_e(\xi,t)$ circumferential displacement of the surface of the tyre in contact with the road surface $\xi$ local coordinate along the contact zone D/Dt material derivative ∂/∂t Euler's equation in respect of time ∂/∂x Euler's equation in respect of space In stationary conditions we have:

$$V_x(\xi) = V_{Cx} - \omega R + V_{Cx}\frac{\partial u_e(\xi)}{\partial \xi}$$

In the grip zone, i.e. in the zone where the necessary requirement for the static grip conditions has been met $$V_{Cx} - \omega R + V_{Cx}\frac{\partial u_e(\xi)}{\partial \xi} = 0, \rightarrow \frac{\partial u_e(\xi)}{\partial \xi} = \frac{V_{Cx} - \omega R}{V_{Cx}}$$

This condition is met if the tangential contact action $\tau(\xi)$ satisfies the static requirement $|\tau(\xi)| \le \mu_s p(\xi)$ with $\xi \in [0, L_{ader}]$ being respectively $\mu_s$, $p(\xi)$ the static grip coefficient and the distribution of the normal contact actions with the road surface. The elastic displacement $u_e(\xi)$ of the tyre in the contact zone with the road surface can be expressed as the sum of the elastic displacement $u_b(\xi)$ of the wheel's internal surface and of the elastic displacement $u_t(\xi)$ due to the deformation of the brushes:

$$u_e(\xi) = u_t(\xi) + u_b(\xi) \qquad 5$$

The displacement field accessible for measurement is just $u_b(\xi)$. In addition, the elastic displacements in question are directly correlated to the tangential contact action by means of the relations:

$$\tau = k_t u_t$$
$$k_b \frac{\partial^2 u_b}{\partial \xi^2} = \tau$$

the first relating to the elastic behaviour of the individual brush, the second to the elastic behaviour of the continuous band to which the brushes are attached, and with $k_t$, $k_b$ appropriate constructive constants of the wheel.

Combining the preceding relations there is obtained the link between the tangential contact action and displacement $u_b(\xi)$ $$\frac{1}{k_t}\frac{\partial \tau}{\partial \xi} + \frac{1}{k_b}\int_0^\xi \tau(\xi')\,d\xi' = \frac{V_{Cx} - \omega R}{V_{Cx}}$$

The solution of the integro-differential equation, which expresses the distribution of the tangential ground contact stress, can be obtained in power series form:

$$\tau(\xi) = \frac{\omega R - V_{Cx}}{V_{Cx}} \sum_{n=0}^{\infty} (-1)^{n+1} \left(\frac{k_t}{k_b}\right)^n \frac{\xi^{2n+1}}{(2n+1)!}$$

In the series, the term n=0 is the prevalent term which follows a higher order correction. Stress performance is therefore linear with a decrease due to the term of the third order. This performance is maintained along the entire region in which the following is satisfied $$|\tau(\xi)| \leq \mu_s p(\xi)$$

In which there is no spin.

Outside this interval the tangential stress in however constant and, in general, much lower. Tangential stress performance therefore presents a performance that commences at zero on the entry edge of the tyre impression and increases to a maximum peak along the incipient spin line. In the spin zone its value then falls to a much lower level. The tangential stress is therefore an excellent indication by means of the localisation of its peak value, of the transition zone between the grip region and the spin region.

The magnitude measured with the FBG sensor is the $\epsilon_{FBG}(t)$ deformation of the internal circumferential elastic band, and the sensor being integral to the tyre, this magnitude varies over time. At the point identified by $\xi$ in the contact zone, the deformation is $$\varepsilon(\xi) = \frac{\partial u_b}{\partial \xi},$$

which can be correlated to the measurement $\epsilon_{FBG}(t)$ recorded over time by the individual FBG sensor of the series mounted on the fibre optic and integral to the tyre carcass. In fact $$\frac{D\epsilon_{FBG}(t)}{Dt} = V_{Cx}\frac{\partial \varepsilon}{\partial \xi} \rightarrow \frac{\partial \varepsilon(\xi)}{\partial \xi} = \frac{1}{V_{Cx}}\frac{D\epsilon_{FBG}(\xi/V_{Cx})}{Dt}$$

From the equation $$k_b \frac{\partial^2 u_b}{\partial \xi^2} = \tau$$

follows $$k_b \frac{\partial \varepsilon}{\partial \xi} = \tau,$$

from which the tangential stress identified $\tau_{id}$ on the basis of the measurement $\epsilon_{FBG}(t)$ of the FBG sensor:

$$\tau_{id}(\xi) = \frac{k_b}{V_{Cx}} \frac{D\epsilon_{FBG}(\xi/V_{Cx})}{Dt}$$

Figure 3:
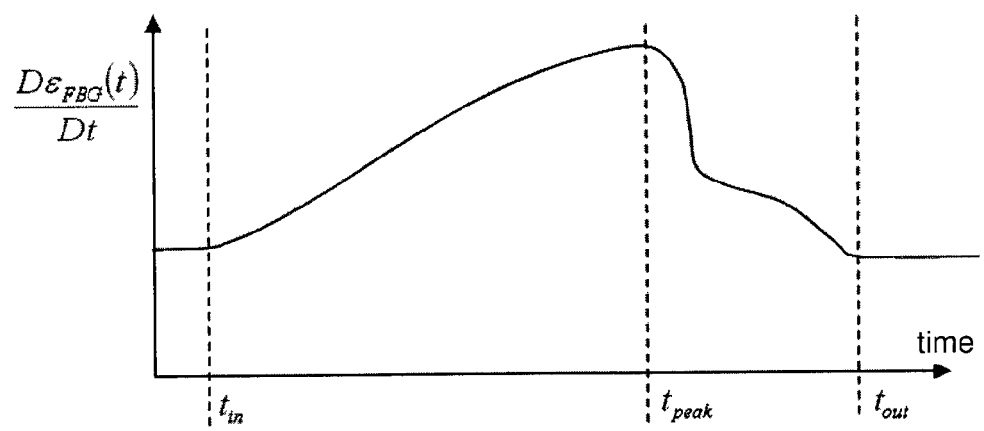
FIG. 3 represents an example graph that shows a typical performance of the derivative of the deformation detected by the system of the invention.

It therefore follows that it is sufficient to analyse the data $$\frac{D\epsilon_{FBG}(t)}{Dt},$$

qualitatively represented by the graph in FIG. 3 according to the foregoing considerations, while identifying three characteristic instants of time $t_{in}$, $t_{peak}$, $t_{out}$ during its performance. The residual grip $G_{res}$ is then provided by the expression:

$$G_{res} = \frac{t_{peak} - t_{in}}{t_{out} - t_{in}}$$

ratio that is theoretically close to the grip contact area and overall contact area to road surface ratio. The above model suggests that outside the contact impression, the tangential actions are cancelled out and the associated circumferential deformations measured by the FBG sensors are constant along the entire remaining rotation arc.

We describe the procedure followed to implement the method previously described in the system of the invention. During a rotation of the tyre, the characteristic time $t_{in}$ is defined by the following two equations:

$$\begin{cases} \frac{D\epsilon_{FBG}(t)}{Dt} = 0 \text{ per } t < t_{in} \\ \frac{D\epsilon_{FBG}(t)}{Dt} \neq 0 \text{ per } t > t_{in} \end{cases}$$

similarly the characteristic time $t_{out}$ is defined by the following two equations:

$$\begin{cases} \dfrac{D\varepsilon_{FBG}(t)}{Dt} \neq 0 \text{ per } t < t_{out} \\ \dfrac{D\varepsilon_{FBG}(t)}{Dt} = 0 \text{ per } t > t_{out} \end{cases}$$

per = for while the characteristic time $t_{peak}$ is defined by the following equation:

$$\max_t \left\{ \dfrac{D\varepsilon_{FBG}(t)}{Dt} \right\} = \dfrac{D\varepsilon_{FBG}(t_{peak})}{Dt}$$

the following condition having been met:

$$t_{in} < t_{peak} < t_{out}$$

Figure 4:
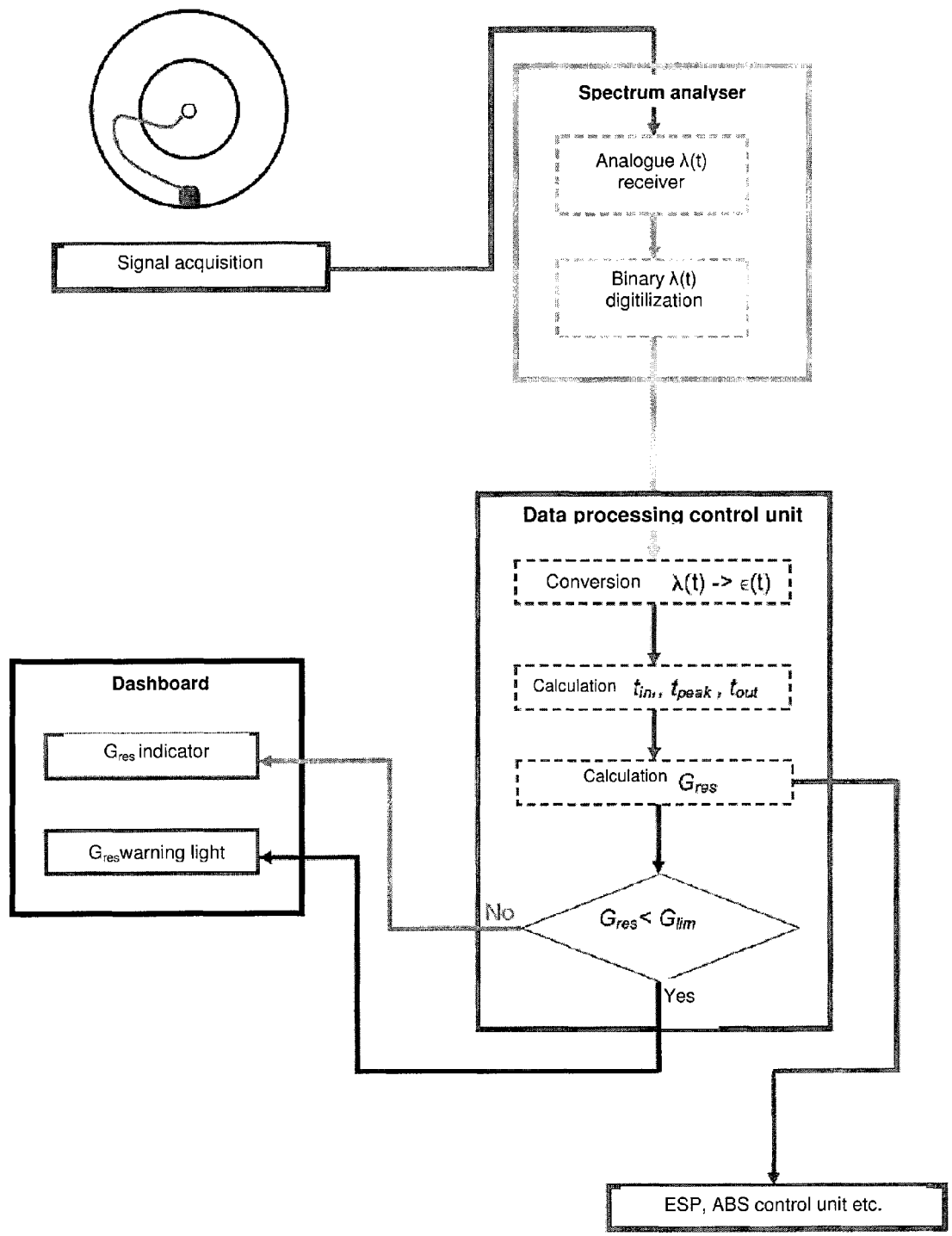
FIG. 4 represents a block diagram, which shows a schematic view of the data flow and the respective processing performed by the system of FIG. 1.

The measurement chain is schematically illustrated in FIG. 4: the signal collected by the sensor FBG is sent via the optic fibre, to a spectrum analyser that is integral to the chassis of the vehicle. The spectrum analyser transforms the analogue light signal received into a digital electric signal containing information on the wave length $\lambda(t)$; the binary signal $\lambda(t)$ is then sent to the appropriate control unit 14 for controlling the residual grip $G_{res}$. $\lambda(t)$ is converted into a deformation signal $\varepsilon(t)$, the characteristic times $t_{in}$, $t_{peak}$, $t_{out}$, and the residual grip $G_{res}$ are then calculated by means of the foregoing formulae. The data $G_{res}$ is sent onto an analogue or digital indicator arranged on the dashboard so that the information is visible to the driver.

The data $G_{res}$ is possibly sent to the control units, which control the vehicle's dynamics, such as ABS, ESP, etc.

The invention claimed is:

1. A system for measuring a grip between a tire mounted on a vehicle and a road surface, wherein the tire is mounted on a rim, wherein the rim is coupled to a perforated axle for rotation therewith, and wherein the tire has a rubber exterior and an interior containing compressed air, wherein the system comprises:
   one or more optical fibers provided with FBG sensors secured within the rubber or fixed to an internal surface of the tire, and adapted to record data regarding the state of the tire, and associated with different reflected wavelength $\lambda$, said one or more optical fibers having an end part which emerges from the tire and extends through the perforated axle, terminating in a first lens, such that said tire, rim, axle and first lens rotate together when the tire rotates,
   an optical joint to transmit the data to an instrumentation within the vehicle, the optical joint including the first lens and a second lens which is not rotatable relative to the vehicle and which is positioned to communicate with the first lens,
   a spectrum analyzer to receive data transmitted through the optical joint from the FGB sensors, which data is sent to a data processing device, adapted to implement a residual grip identification algorithm and to send information regarding the residual grip to a device indicating the state of the tire available for a user of the vehicle and/or to active control systems for controlling the vehicle.

2. The system according to claim 1, wherein the optical joint is an axial coupler, adapted to carry out a transmission of a light beam for transmitting data in a direction which is parallel to that of a wheel axle of the vehicle.

3. The system according to claim 1, wherein the optical joint is a radial coupler, adapted to carry out a transmission of a light beam for transmitting data in a direction which is orthogonal to that of a wheel axle of the vehicle.

4. The system according to claim 1, wherein several FBG sensors are arranged on said optical fibers to operate in multiplex mode.

5. A method for measuring the grip between a tire and a road surface using the system according to claim 1, comprising the following steps:
   a—defining an algorithm based on determining three characteristic times $t_{in}$, $t_{peak}$, $t_{out}$ which are necessary for monitoring a residual grip status of the tire,
   b—sending an interrogation signal from a light source through every FBG sensor,
   c—generating reflected signals from the FBG sensors which are correlated to a deformation of the FBG sensor,
   d—generating, by using a spectrum analyzer, a signal containing information regarding $\lambda(t)$ and a digitalization thereof,
   e—sending the response signal $\lambda(t)$ to the data processing device,
   f—converting said response signals $\lambda(t)$ into strain signals $\varepsilon(t)$ for every FBG sensor which is interrogated,
   g—the data processing device calculating the three characteristic times:
   $t_{in}$ by using the formulae $$\dfrac{D\varepsilon_{FBG}(t)}{Dt} = 0 \text{ for } t < t_{in}$$

$$\dfrac{D\varepsilon_{FBG}(t)}{Dt} \neq 0 \text{ for } t > t_{in}$$

$t_{out}$ by using the formulae $$\begin{cases} \dfrac{D\varepsilon_{FBG}(t)}{Dt} \neq 0 \text{ per } t < t_{out} \\ \dfrac{D\varepsilon_{FBG}(t)}{Dt} = 0 \text{ per } t > t_{out} \\ \dfrac{D\varepsilon_{FBG}(t)}{Dt} \neq 0 \text{ per } t < t_{out} \\ \dfrac{D\varepsilon_{FBG}(t)}{Dt} = 0 \text{ per } t > t_{out} \end{cases}$$

$t_{peak}$ by using the formulae $$\max_t \left\{ \dfrac{D\varepsilon_{FBG}(t)}{Dt} \right\} = \dfrac{D\varepsilon_{FBG}(t_{peak})}{Dt}$$

h—calculating the residual grip $G_{res}$ by using the formula:

$$G_{res} = \dfrac{t_{peak} - t_{in}}{t_{out} - t_{in}}.$$

6. The method according to claim 5, further comprising the step of determining the rolling angular speed of the tire, and wherein stages b) to h) are repeated at very short time intervals, depending on the rolling angular speed of the tire.

7. The system of claim 1, wherein the residual grip information is used to control the vehicle.

* * * * *